United States Patent
Tsukuda et al.

(10) Patent No.: US 7,272,099 B2
(45) Date of Patent: Sep. 18, 2007

(54) EXPOSURE APPARATUS OF AN OPTICAL DISK MASTER, METHOD OF EXPOSING AN OPTICAL DISK MASTER AND PINHOLE MECHANISM

(75) Inventors: Masahiko Tsukuda, Suita (JP); Shinya Abe, Kadoma (JP); Morio Tomiyama, Ikoma (JP); Shuji Sato, Neyagawa (JP); Eiichi Ito, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 283 days.

(21) Appl. No.: 10/187,491

(22) Filed: Jul. 1, 2002

(65) Prior Publication Data
US 2003/0021214 A1 Jan. 30, 2003

(30) Foreign Application Priority Data
Jun. 29, 2001 (JP) ............................. 2001-198153

(51) Int. Cl.
*G11B 7/00* (2006.01)
(52) U.S. Cl. .................. 369/112.02; 369/118
(58) Field of Classification Search .......... 369/112.02, 369/118, 112.24, 112.01, 112.25, 112.26, 369/112.23
See application file for complete search history.

(56) References Cited

U.S. PATENT DOCUMENTS

| | | | | |
|---|---|---|---|---|
| 2,213,307 A | * | 9/1940 | Elliott | 359/668 |
| 4,209,793 A | * | 6/1980 | Ueno | 347/241 |
| 4,766,585 A | * | 8/1988 | Fukumoto et al. | 369/44.24 |
| 4,838,989 A | * | 6/1989 | Ashby et al. | 216/87 |
| 5,144,602 A | * | 9/1992 | Kudoh et al. | 369/13.32 |
| 5,612,942 A | * | 3/1997 | Takahashi | 369/112.18 |
| 5,615,186 A | * | 3/1997 | Rosen et al. | 369/44.24 |
| 6,072,763 A | * | 6/2000 | Takahashi | 369/118 |
| 6,091,688 A | * | 7/2000 | Tanoue et al. | 369/47.35 |
| 6,111,828 A | * | 8/2000 | McLeod et al. | 369/44.23 |
| 6,172,957 B1 | | 1/2001 | Ogasawara | |
| 6,212,154 B1 | * | 4/2001 | Yoo et al. | 369/118 |
| 6,570,840 B1 | * | 5/2003 | Wilkinson et al. | 369/275.4 |

FOREIGN PATENT DOCUMENTS

| | | |
|---|---|---|
| JP | 05-81708 | 4/1993 |
| JP | 05-314543 | 11/1993 |
| JP | 08-203135 | 8/1996 |
| JP | 09-035308 | 2/1997 |
| JP | 09-231610 | 9/1997 |
| JP | 10-269611 | 10/1998 |
| JP | 11-162022 | 6/1999 |
| JP | 2000-021002 | 1/2000 |

* cited by examiner

OTHER PUBLICATIONS

Chinese Office Action for Patent Application No. 021412472, dated Nov. 5, 2004 (with English translation).

*Primary Examiner*—Wayne Young
*Assistant Examiner*—Lixi Chow
(74) *Attorney, Agent, or Firm*—RatnerPrestia

(57) ABSTRACT

An exposure apparatus of an optical disk master having a laser source, a deflector for deflecting a recording laser beam obtained based on the laser beam of the laser source and an objective lens for focusing the recording laser beam on an optical disk master, has a lens system provided between the laser source and the deflector, which has a first lens for focusing the laser beam and a second lens for adjusting the focused laser beam to a desired beam diameter; and a pinhole placed at a practical focal position of the lens system.

10 Claims, 10 Drawing Sheets

EXPOSURE APPARATUS OF AN OPTICAL DISK MASTER, METHOD OF EXPOSING AN OPTICAL DISK MASTER AND PINHOLE MECHANISM

BACKGROUND OF THE INVENTION

1. Field of the Invention

The present invention relates to an exposure apparatus of an optical disk master, and more particularly, to an exposure apparatus and method of an optical disk master using a deflector.

2. Description of the Related Art

FIG. 2 shows an example of a conventional exposure apparatus of an optical disk master. In FIG. 2, reference numeral 201 denotes a laser source; 202, an EO modulator that eliminates low-frequency noise of the laser or performs power control; 203, an AO modulator that performs modulation using an information signal; 204, a lens system that focuses a laser beam into a crystal of the AO modulator; 205, an EO deflector; 206, a beam expander that focuses the laser beam and enlarges it to a desired beam diameter; 207, a polarizing beam splitter (PBS); 208, a ¼ wavelength plate; 209, a head that focuses the laser beam on a resist master; 210, a turn table that turns the resist master; 211, a CCD camera that monitors the laser beam reflected from the resist master; 212, a lens that focuses the laser beam onto the CCD camera.

The laser beam output from the laser source 201 enters the EO modulator 202, called a "noise eater", to reduce laser noise input to the EO modulator 202 and adjust the laser beam to desired intensity. The laser beam that has passed through the noise eater enters the AO modulator 203 that performs intensity modulation using an information signal. Since the modulation speed of the AO modulator 203 depends on the beam diameter in the crystal; the greater the degree of focusing of the beam, the faster the modulation becomes, the lens system 204 is arranged in such a way as to come into focus in the crystal of the AO modulator 203. Primary diffracted light output from the AO modulator 203 is input to the EO deflector 205 that performs deflection modulation. The laser beam output from the deflector 205 is enlarged in the beam diameter by the beam expander 206 and then focused onto the resist master by the head 209 to expose and record the information signal.

SUMMARY OF THE INVENTION

The laser beam that has passed through optical elements such as the AO modulator and EO modulator is affected to no small extent by wavefront fluctuation and its beam profile is deformed from an ideal Gaussian distribution form. To eliminate wavefront fluctuation of the laser beam that has passed through the optical elements, beam forming using a pinhole is generally practiced. This is a method whereby the laser beam that has passed through the optical elements and has been affected to no small extent by wavefront fluctuation is focused by a lens system, a pinhole of almost the same diameter as the beam diameter is placed at the focal position of the focused laser beam, the disturbance component which has not been focused due to wavefront fluctuation and distributed outside the laser beam diameter is removed, and the central area with strong beam intensity is neatly extracted to thereby eliminate wavefront fluctuation.

In order to eliminate wavefront fluctuation as much as possible, it is effective to place the pinhole at the final stage before the head to eliminate wavefront fluctuation accumulated after the laser beam has passed through all the optical elements. However, in the case of the exposure apparatus of an optical disk master using the deflector 205 as shown in FIG. 2, if a pinhole is placed after the deflector 205 such as between a pair of lenses of the beam expander 206, the laser beam is blocked by the pinhole when the laser beam is deflected, causing the laser beam to be subjected to intensity modulation, which prevents beam forming using the pinhole.

In view of the above-described conventional problem, it is an object of the present invention to reduce wavefront fluctuation of light output from the deflector of an exposure apparatus of an optical disk master and improve the focusing performance of the laser beam that has passed through the objective lens.

One aspect of the present invention is an exposure apparatus of an optical disk master having a laser source, a deflector for deflecting a recording laser beam obtained based on the laser beam of said laser source and an objective lens for focusing said recording laser beam on an optical disk master, comprising a lens system provided between said laser source and said deflector, which has a first lens for focusing said laser beam and a second lens for adjusting said focused laser beam to a desired beam diameter; and a pinhole placed at a practical focal position of said lens system.

Another aspect of the present invention is an exposure apparatus of an optical disk master having a laser source, a deflector for deflecting a recording laser beam based on the laser beam of said laser source and an objective lens for focusing said recording laser beam on an optical disk master, comprising:

a lens system provided between said deflector and said objective lens, which has a first lens for focusing said laser beam emitted from said deflector and a second lens for adjusting said focused laser beam to a desired beam diameter; and a slit placed at a practical focal position of said lens system, of which aperture is restricted by a predetermined width in such a direction which is substantially perpendicular to the deflected direction of said deflector.

Still another aspect of the present invention is an exposure apparatus of an optical disk master having a laser source, a deflector for deflecting a recording laser beam based on the laser beam of said laser source and an objective lens for focusing said recording laser beam on an optical disk master, comprising:

a first lens system between said laser source and said deflector, which has a first lens provided for focusing said laser beam and a second lens for adjusting said focused laser beam to a desired beam diameter;

a pinhole placed at a practical focal position of said first lens system.

a second lens system provided between said deflector and said objective lens which has a third lens for focusing the laser beam emitted from said deflector and a fourth lens for adjusting said focused laser beam to a desired beam diameter; and a slit placed at a practical focal position of said second lens system, of which aperture is restricted by a predetermined width in such a direction which is substantially perpendicular to the deflected direction of said deflector.

Yet still another aspect of the present invention is an exposure apparatus of an optical disk master having a laser source, a deflector for deflecting a recording laser beam obtained based on the laser beam of said laser source and an objective lens for focusing said recording laser beam on an optical disk master, comprising:

a lens system provided between said deflector and said objective lens, which has a first lens for focusing said laser beam emitted from said deflector and a second lens for adjusting said focused laser beam to a desired beam diameter;

a pinhole placed at a practical focal position of said lens system; and driving means of translating said pinhole in substantially the same direction as the deflection direction of said deflector in synchronization with a deflection signal input to said deflector.

Still yet another aspect of the present invention is an exposure apparatus of an optical disk master having a laser source, a deflector for deflecting a recording laser beam based on the laser beam of said laser source and an objective lens for focusing said recording laser beam on an optical disk master, comprising:

a liquid crystal plate provided between said laser source and said deflector;

a parallel flat plate provided between said deflector and said objective lens for branching said recording laser beam;

a photodetector that detects reflected light from said parallel flat plate; and adjusting means of adjusting a voltage applied to said liquid crystal plate based on information on wavefront fluctuation of said recording laser beam detected by said photodetector.

A further aspect of the present invention is the exposure apparatus of an optical disk master, wherein the wavelength of said laser source is 270 nm or less.

A still further aspect of the present invention is the exposure apparatus of an optical disk master, wherein the diameter of said pinhole is 2.5·λ·f/w or less, where λ is the wavelength of said laser source, f is the focal distance of the lens for focusing said laser beam, and w is the radius of the beam incident upon the lens for focusing said laser beam.

A yet further aspect of the present invention is the exposure apparatus of an optical disk master, wherein the aperture of said slit is 2.5·λ·f/w or less, where λ is the wavelength of said laser source, f is the focal distance of the lens for focusing said laser beam, and w is the radius of the beam incident upon the lens for focusing said laser beam.

A still yet further aspect of the present invention is the exposure apparatus of an optical disk master, wherein the translation distance of said pinhole is f·θ, where f is the focal distance of the lens for focusing said laser beam, and θ is the deflection angle of said deflector.

An additional aspect of the present invention is the exposure apparatus of an optical disk master, wherein said liquid crystal plate has such a structure that it is divided into a plurality of concentric parts.

A still additional aspect of the present invention is a method of exposing and optical disk master including a step of deflecting a recording laser beam obtained based on the laser beam of a laser source and a step of focusing said recording laser beam on an optical disk master, comprising the steps of:

branching said recording laser beam between said deflecting step and said step of focusing said recording laser beam;

detecting the reflected light obtained in said branching step; and adjusting a voltage applied to said liquid crystal plate provided between said laser source and said deflector based on information on wavefront fluctuation of said recording laser beam detected in said detecting step.

A yet additional aspect of the present invention is the method of exposing and optical disk master, wherein the wavelength of said laser source is 270 nm or less.

A still yet additional aspect of the present invention is the method of exposing and optical disk master, wherein said liquid crystal plate has such a structure that it is divided into a plurality of concentric parts.

A supplementary aspect of the present invention is a method of controlling an exposure apparatus of an optical disk master comprising a laser source, a deflector for deflecting a recording laser beam obtained based on the laser beam of said laser source and an objective lens for focusing said recording laser beam on an optical disk master, a lens system having a first lens provided between said deflector and said objective lens for focusing said laser beam emitted from said deflector and a second lens for adjusting said focused laser beam to a desired beam diameter, and a pinhole placed at a practical focal position of said lens system, comprising:

a steps of translating said translating said pinhole in substantially the same direction as the deflection direction of said deflector in synchronization with a deflection signal input to said deflector.

A still supplementary aspect of the present invention is a pinhole mechanism used in an exposure apparatus of an optical disk master provided with a laser source, a deflector for deflecting a recording laser beam obtained based on the laser beam of said laser source and an objective lens for focusing said recording laser beam on an optical disk master, comprising:

a lens system provided between said deflector and said objective lens, which has a first lens for focusing a laser beam emitted from said deflector and a second lens for adjusting said focused laser beam to a desired beam diameter;

a pinhole placed at a practical focal position of said lens system; and driving means of translating said pinhole in substantially the same direction as the deflection direction of said deflector in synchronization with a deflection signal input to said deflector.

As described above, the present invention adopts, for example, a structure for an exposure apparatus of an optical disk master using a deflector with a beam forming pinhole before the deflector to thereby eliminate wavefront fluctuation of the laser beam accumulated until it input to the deflector, reduce wavefront fluctuation of the light output from the deflector and improve the focusing performance of the laser beam after passing through the objective lens.

DESCRIPTION OF SYMBOLS

Figure 1:
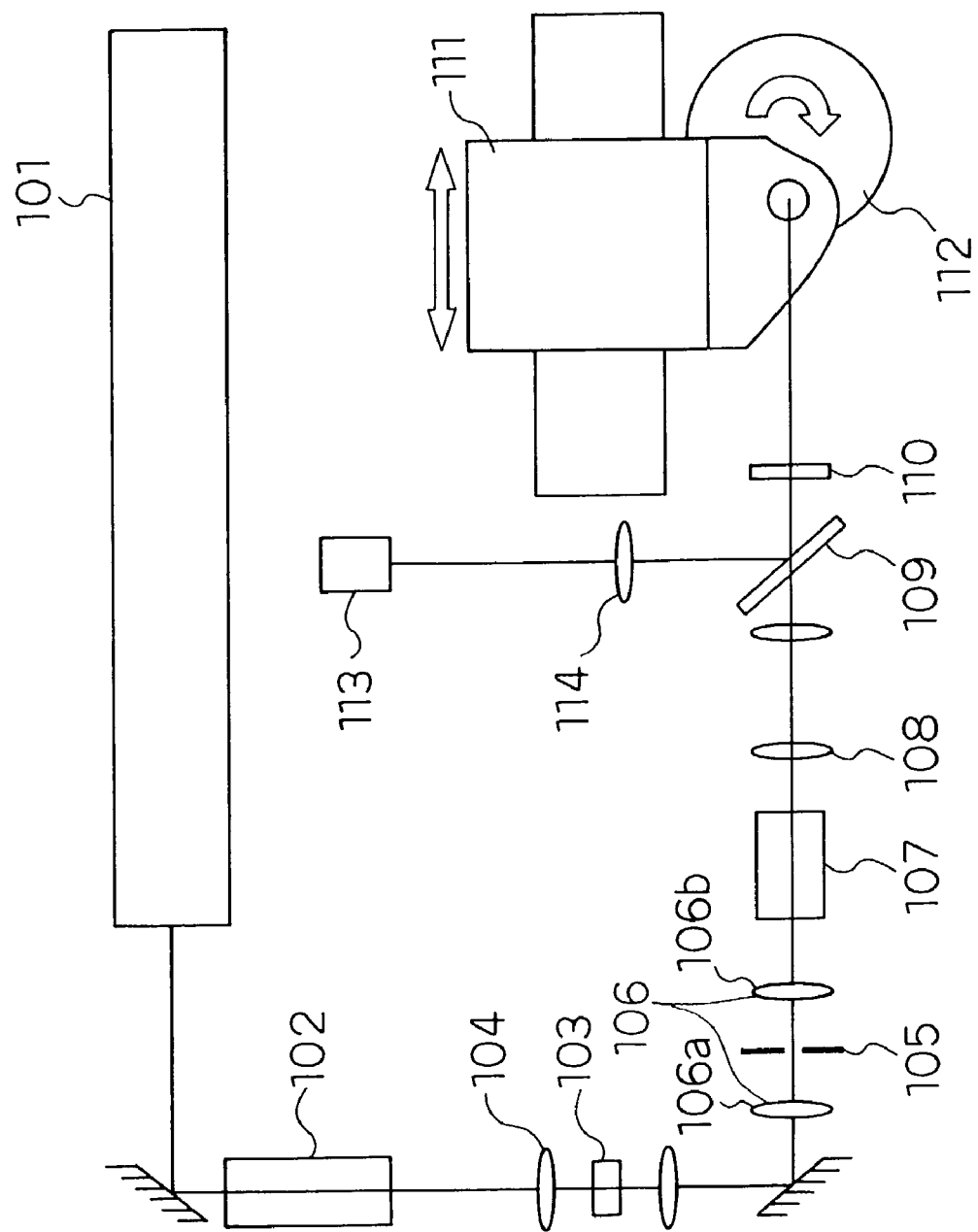
FIG. 1 illustrates Embodiment 1 of an exposure apparatus of an optical disk master of the present invention.
Figure 2:
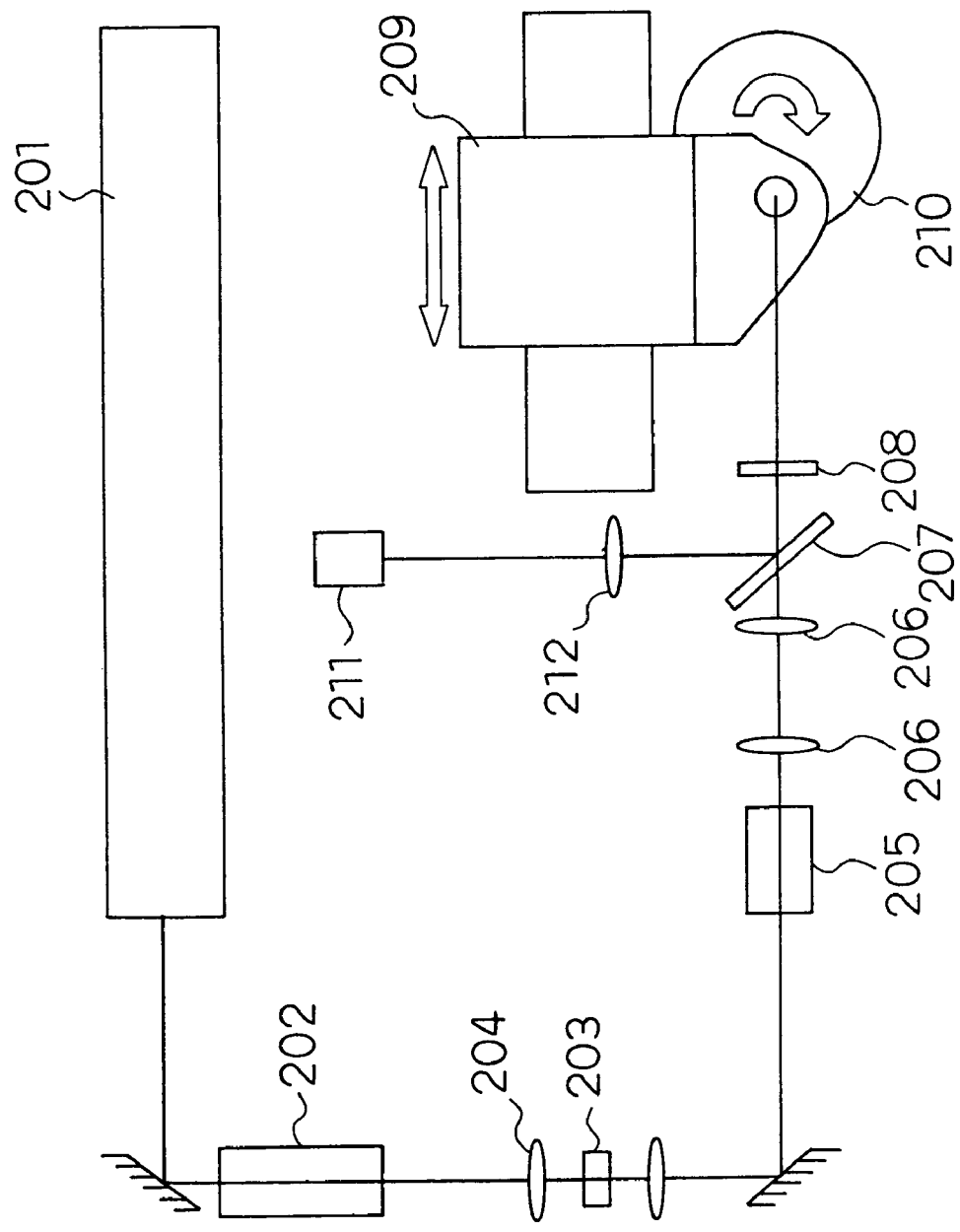
FIG. 2 illustrates an example of a conventional exposure apparatus of an optical disk master.

101 Laser source
102 EO modulator
103 AO modulator
104 Lens system
105 Pinhole
106 Lens system
107 EO deflector
108 Beam expander
109 Polarizing beam splitter
110 ¼ wavelength plate
111 Head
112 Turn table
113 CCD camera
114 Lens
201 Laser source
202 EO modulator
203 AO modulator
204 Lens system
205 EO deflector
206 Lens system
207 Polarizing beam splitter
208 ¼ wavelength plate
209 Head
210 Turn table
211 CCD camera
212 Lens
301 Laser source
302 EO modulator
303 AO modulator
304 Lens system
305 EO deflector
306 Beam expander
307 Slit
308 Polarizing beam splitter
309 ¼ wavelength plate
310 Head
311 Turn table
312 CCD camera
313 Lens
401 Laser source
402 EO modulator
403 AO modulator
404 Lens system
405 Pinhole
406 Lens system
407 EO deflector
408 Beam expander
409 Slit
410 Polarizing beam splitter
411 ¼ wavelength plate
412 Head
413 Turn table
414 CCD camera
415 Lens
601 Laser source
602 EO modulator
603 AO modulator
604 Lens system
605 EO deflector
606 Beam expander
607 Pinhole
608 Piezoelectric element
609 Deflection signal generator
610 Polarizing beam splitter
611 ¼ wavelength plate
612 Head
613 Turn table
614 CCD camera
615 Lens
701 Laser source
702 EO modulator
703 AO modulator
704 Lens system
705 Liquid crystal plate
706 EO deflector
707 Beam expander
708 Parallel flat plate
709 Photodetector
710 Operation circuit
711 Polarizing beam splitter
712 ¼ wavelength plate
713 Head
714 Turn table
715 CCD camera
716 Lens
1001 Split liquid crystal plate outer perimeter
1002 Split liquid crystal plate intermediate perimeter
1003 Split liquid crystal plate inner perimeter
1101 Laser beam detected by photodetector
1102 Interference pattern
1103 Laser beam detected by photodetector
1104 Interference pattern

DETAILED DESCRIPTION OF THE PREFERRED EMBODIMENTS

Embodiments of the present invention will be explained below.

Embodiment 1

FIG. 1 illustrates an example of an exposure apparatus of an optical disk master of the present invention. In FIG. 1, reference numeral 101 denotes an argon ion laser with a wavelength of 248 nm which serves as a laser source; 102, an EO modulator that eliminates low frequency noise of the laser and performs power control; 103, an AO modulator that performs modulation using an information signal; 104, a lens system that focuses the laser beam onto a crystal of the AO modulator; 105, a pinhole; 106, a lens system that focuses the laser beam onto the pinhole 105 and forms the laser beam output into a parallel beam; 107, an EO deflector; 108, a beam expander that enlarges the laser beam to a desired beam diameter; 109, a polarizing beam splitter (PBS); 110, a ¼ wavelength plate; 111, a head that focuses the laser beam onto a resist master; 112, a turn table that turns the resist master; 113, a CCD camera that monitors the laser beam reflected from the resist master; 114, a lens that focuses the laser beam onto the CCD camera.

Furthermore, the lens system 106 is provided with a first lens 106a provided near the laser source 101 for focusing and a second lens 106b provided near the EO deflector 107 for obtaining a predetermined beam diameter. In the above-described configuration, the laser source 101 corresponds to the laser source of the present invention; the EO deflector 107, the deflector of the present invention; the lens system 106, the lens system of the present invention; the first lens 106a, the first lens of the present invention; the second lens 106b, the second lens of the present invention; the pinhole 105, the pinhole of the present invention; and the head 111, the objective lens of the present invention.

The laser beam output from the laser source 101 enters the EO modulator 102, called a "noise eater" to reduce laser noise and adjust the laser beam to desired intensity. The laser beam that has passed through the noise eater enters the AO modulator 103 that performs intensity modulation using an information signal. The modulation speed of the AO modulator 103 depends on the beam diameter in the crystal and allows faster modulation as the degree of focusing of the beam increases, and therefore the lens system 104 is placed so as to come into focus in the crystal of the AO modulator 103. The primary diffracted light output from the AO modulator 103 enters the EO deflector 107 that performs deflection modulation. Furthermore, the laser beam output from the deflector 107 is enlarged in its beam diameter by the beam expander 108 and then focused onto the resist master by the head 111 and exposes/records the information signal.

Figure 5:
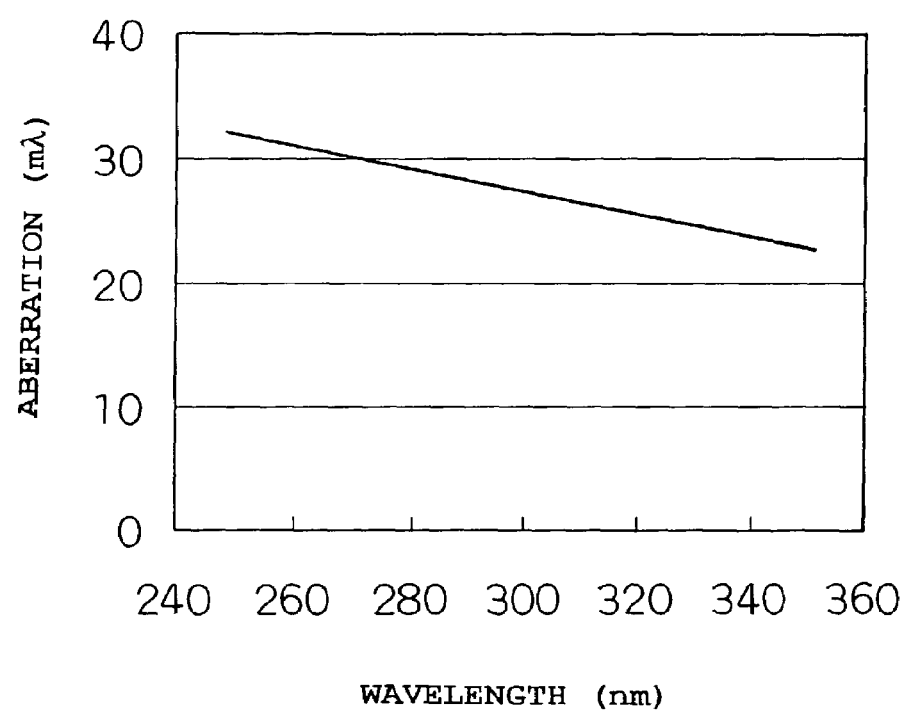
FIG. 5 illustrates an amount of aberration after passing through optical elements.

The laser beam that has passed through the optical elements such as the AO modulator and EO modulator receives wavefront fluctuation and its beam profile is deformed from an ideal Gaussian distribution form. Generally, a lens is said to deteriorate its focusing performance when its aberration is 30 mλ or more. An investigation into aberration received from the optical elements at a wavelength of 351 nm shows that an aberration component is approximately 10 mλ. This aberration component is equivalent to approximately 8 nm for a wavelength of 351 nm. Assuming that wavefront fluctuation received when light passes through the optical elements is almost the same for respective wavelengths, a change of the aberration component versus wavelength is calculated. FIG. 5 shows the change of the aberration component versus wavelength. The aberration component becomes 30 mλ near a wavelength of 270 nm and when the wavelength falls short of 270 nm, this has a large effect on the focusing performance of the objective lens.

Thus, this embodiment performs beam forming using a pinhole to eliminate wavefront fluctuation of the laser beam that has passed through the optical elements. This is a method whereby the laser beam affected by wavefront fluctuation is focused by a focusing lens of the lens system, a pinhole of almost the same diameter as the beam diameter at that position is placed at the focal position of the laser beam, and thereby a disturbance component which is not focused due to wavefront fluctuation and distributed outside the laser beam diameter before passing through the lens for obtaining a predetermined beam diameter is eliminated, the central area with high beam intensity is neatly extracted and wavefront fluctuation is eliminated. At this time, it is preferable that the pinhole shape be virtually a perfect circle and its inner perimeter be smooth.

In order to eliminate wavefront fluctuation as much as possible, it is effective to place the pinhole at the final stage before the head. However, in the case of an exposure recording apparatus using a deflector as shown in Embodiment 1, the laser beam is deflected and therefore the pinhole cannot be placed after the deflector 107. Therefore, as shown in the lens system 106, two flat convex lenses of the same magnification are placed before the deflector as first lens 106a and second lens 106b and the pinhole is placed at the focal position of the lens system 106, that is, at the focal position of the first lens 106a. This structure makes it possible to eliminate the wavefront fluctuation accumulated up to the deflector 107.

Figure 8:
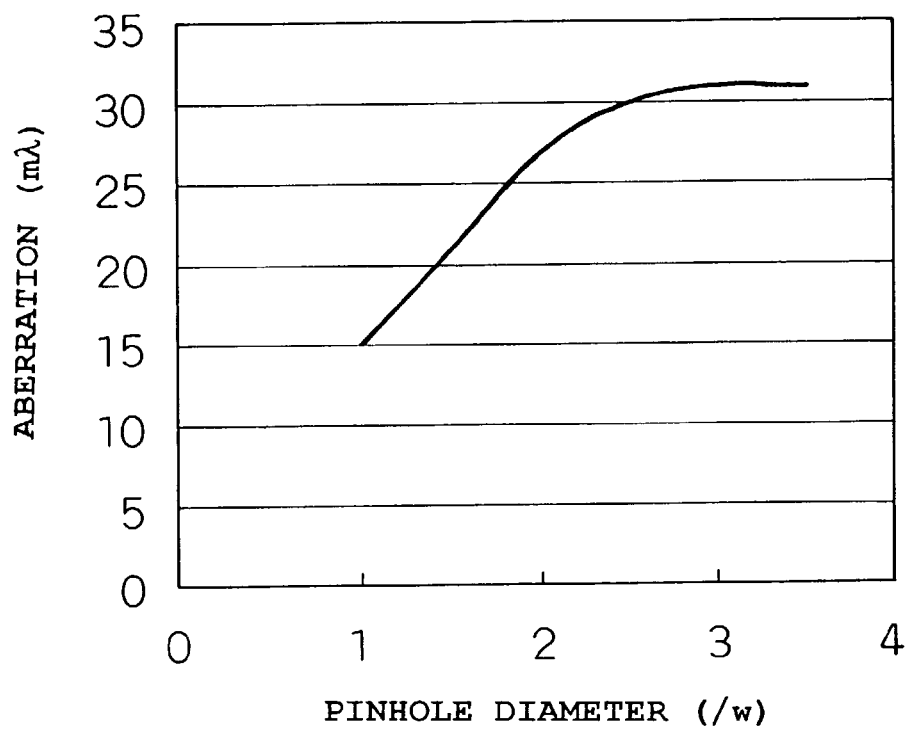
FIG. 8 illustrates a relationship between a pinhole diameter and an amount of aberration.

The beam radius at the focal position of the beam focused by the lens system 106 for focusing the laser beam toward the pinhole 105 is given $\lambda \cdot f/(\pi \cdot w)$, where $\lambda$ is the wavelength of the laser source, f is the focal distance of the lens and w is the radius of the beam incident upon the lens. Thus, the diameter dw of the pinhole is changed to determine the aberration component of the laser beam. FIG. 8 shows the result. The horizontal axis shows the size of the pinhole diameter dw with respect to the beam radius w at the focal position of the lens. When the pinhole diameter is approximately 2.5 times the beam radius or less at the focal position of the lens system 106, the aberration component is 30 mλ or less.

More specifically, assuming that the laser wavelength is on the order of 270 nm, the focal distance of the lens, that is, the distance from the first lens 106a to the focal position is on the order of 40 mm, the pinhole diameter when the beam diameter (2W) at the focal position is 8 μm is set to approximately 10 μm. A specific example of the pinhole diameter is set to 10 μm to 30 μm and the beam diameter at the focal position is adjusted to this range based on the above-described formula.

Furthermore, with regard to the focusing performance of the beam diameter using the pinhole, the following experiment is conducted.

A pit is exposed/recorded on a glass plate on which a resist is coated. Based on the shape of the recorded pit, the beam diameter of the laser beam focused by the objective lens is calculated. When the laser wavelength is 270 nm and NA of the objective lens is 0.9, the beam diameter of the conventional example is 0.33 μmm, while a value of approximately 0.3 μm is obtained as a result of placing the pinhole before the deflector and performing beam forming as in the case of this Embodiment 1. That is, it has been confirmed that the focusing performance has been improved approximately 10% compared to the case without beam forming.

Furthermore, this Embodiment 1 uses an EO modulator and AO modulator as modulators, but similar effects will be obtained also in the case of other combinations irrespective of combinations of modulators.

Embodiment 2

Figure 3:
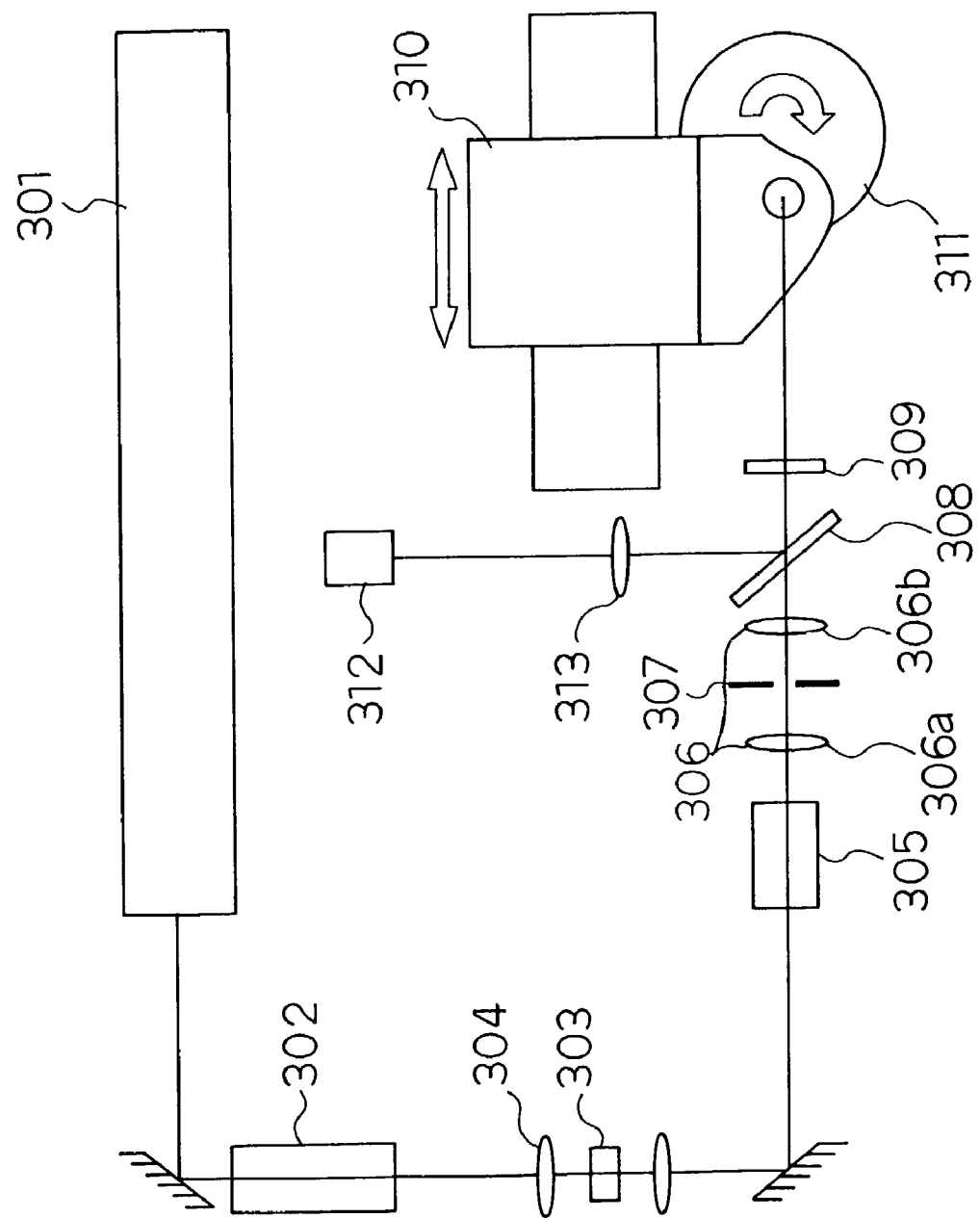
FIG. 3 illustrates Embodiment 2 of an exposure apparatus of an optical disk master of the present invention.

FIG. 3 illustrates an example of an exposure apparatus of an optical disk master of the present invention. In FIG. 3, reference numeral 301 denotes an argon ion laser with a wavelength of 248 nm which serves as a light source; 302, an EO modulator that eliminates low frequency noise of the laser and performs power control; 303, an AO modulator that performs modulation using an information signal; 304, a lens system that focuses the laser beam onto a crystal of the AO modulator; 305, an EO deflector; 306, a beam expander that enlarges the laser beam to a desired beam diameter; 307, a slit of which aperture is restricted by a predetermined width in such a direction which is substantially perpendicular to the deflected direction of the EO deflector 305; 308, a polarizing beam splitter (PBS); 309, a ¼ wavelength plate; 310, a head that focuses the laser beam onto a resist master; 311, a turn table that turns the resist master; 312, a CCD camera that monitors the laser beam reflected from the resist master; 313, a lens that focuses the laser beam onto the CCD camera.

Furthermore, the beam expander 306 is provided with a first lens 306a provided near the EO deflector 305 for focusing and a second lens 306b provided near the head 310 for obtaining a predetermined beam diameter. In the above-described configuration, the laser source 301 corresponds to the laser source of the present invention; the EO deflector 305, the deflector of the present invention; the beam expander 306, the lens system of the present invention; the first lens 306a, the first lens of the present invention; the second lens 306b, the second lens of the present invention; the slit 307, the slit of the present invention; and the head 310, the objective lens of the present invention.

The laser beam output from the laser source 301 enters the EO modulator 302, called a "noise eater" to reduce laser noise and adjust the laser beam to desired intensity. The laser beam that has passed through the noise eater enters the AO modulator 303 that performs intensity modulation using an information signal. The modulation speed of the AO modulator 303 depends on the beam diameter in the crystal and allows faster modulation as the degree of focusing of the beam increases, and therefore the lens system 304 is placed so as to come into focus in the crystal of the AO modulator 303. The primary diffracted light output from the AO modulator 303 enters the EO deflector 305 that performs deflection modulation. Furthermore, the laser beam output from the deflector 305 is enlarged in its beam diameter by the beam expander 306 and then focused onto the resist master by the head 310 and exposes/records the information signal.

The laser beam that has passed through the optical elements such as the AO modulator and EO modulator receives wavefront fluctuation and its beam profile is deformed from an ideal Gaussian distribution form. This is the same as that explained with reference to FIG. 5.

The wavefront fluctuation accumulated up to the beam expander 306 is not focused at the focal position of the first lens 306, which is the front lens of the beam expander 306 and distributed outside the beam diameter.

Therefore, this embodiment places the slit 307 of which aperture is restricted a predetermined width in such a direction which is substantially perpendicular to the deflected direction of the EO deflector 305, at the focal position of the first lens 306a, which is the front lens of the beam expander, eliminates the wavefront fluctuation component distributed outside the beam before it passes through the second lens 306b for acquiring a predetermined beam diameter, extracts the central area with high beam intensity and eliminates the wavefront fluctuation. Furthermore, this embodiment does not restrict the aperture in the deflection direction of the EO defection modulator 305 so that the beam is not blocked even during deflection and no intensity modulation is generated at the output. This makes it possible to improve the focusing performance in the recording direction when the signal pit is exposed/recorded.

Figure 9:
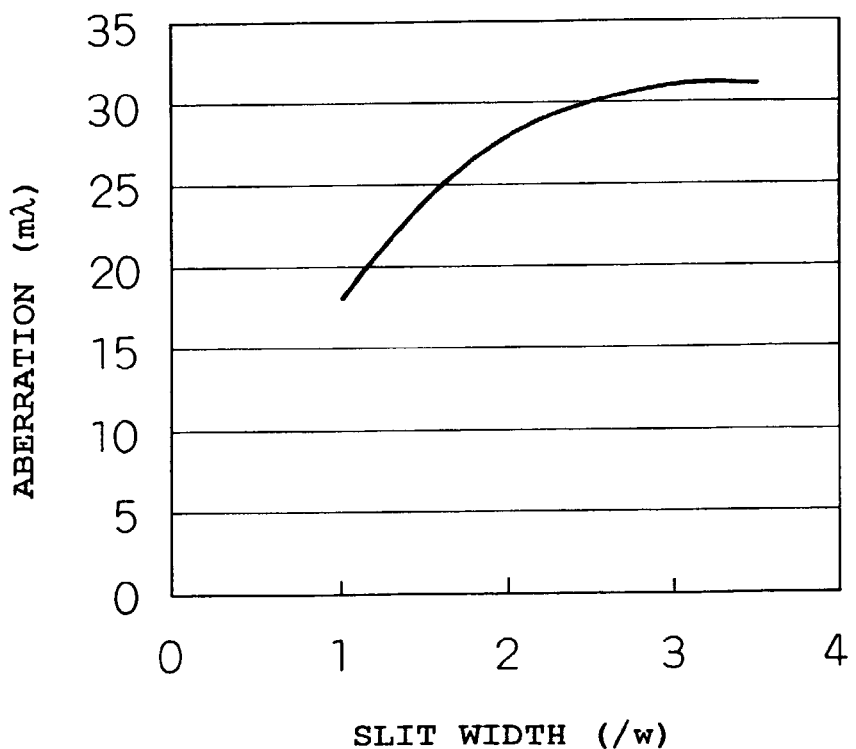
FIG. 9 illustrates a relationship between a slit width and an amount of aberration.
Figure 10:
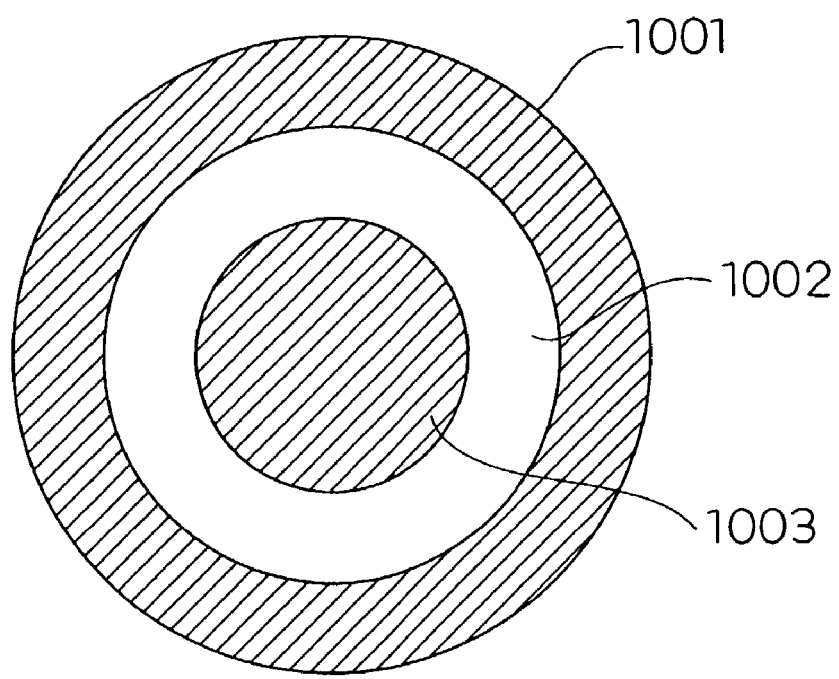
FIG. 10 is a schematic view of a liquid crystal plate used in Embodiment 5 of the present invention.

The beam radius at the focal position of the beam focused by the first lens 306a for focusing the laser beam toward the slit is given as $\lambda \cdot f/(\pi \cdot w)$, where $\lambda$ is the wavelength of the laser source, f is the focal distance of the lens and w is the radius of the beam incident upon the lens. Thus, the aperture of the slit is changed and the aberration component of the laser beam is examined. FIG. 9 shows the result. The horizontal axis shows the size of the aperture of the slit with respect to the beam radius w at the focal position of the lens.

When the slit width is approximately 2.5 times the beam radius or less at the focal position of the lens, the aberration component is 30 m$\lambda$ or less under the same condition as that of Embodiment 1.

Furthermore, an experiment is conducted about the beam diameter focusing performance using the slit under the same condition as that in Embodiment 1.

A pit is exposed/recorded on a glass plate on which a resist is coated. Based on the shape of the recorded pit, the beam diameter of the laser beam focused by the objective lens is calculated. It has been confirmed that as a result of performing beam forming with the slit placed after the deflector as in the case of this Embodiment 2, the beam diameter focusing performance has been improved approximately 10% compared to the case without beam forming.

Embodiment 3

Figure 4:
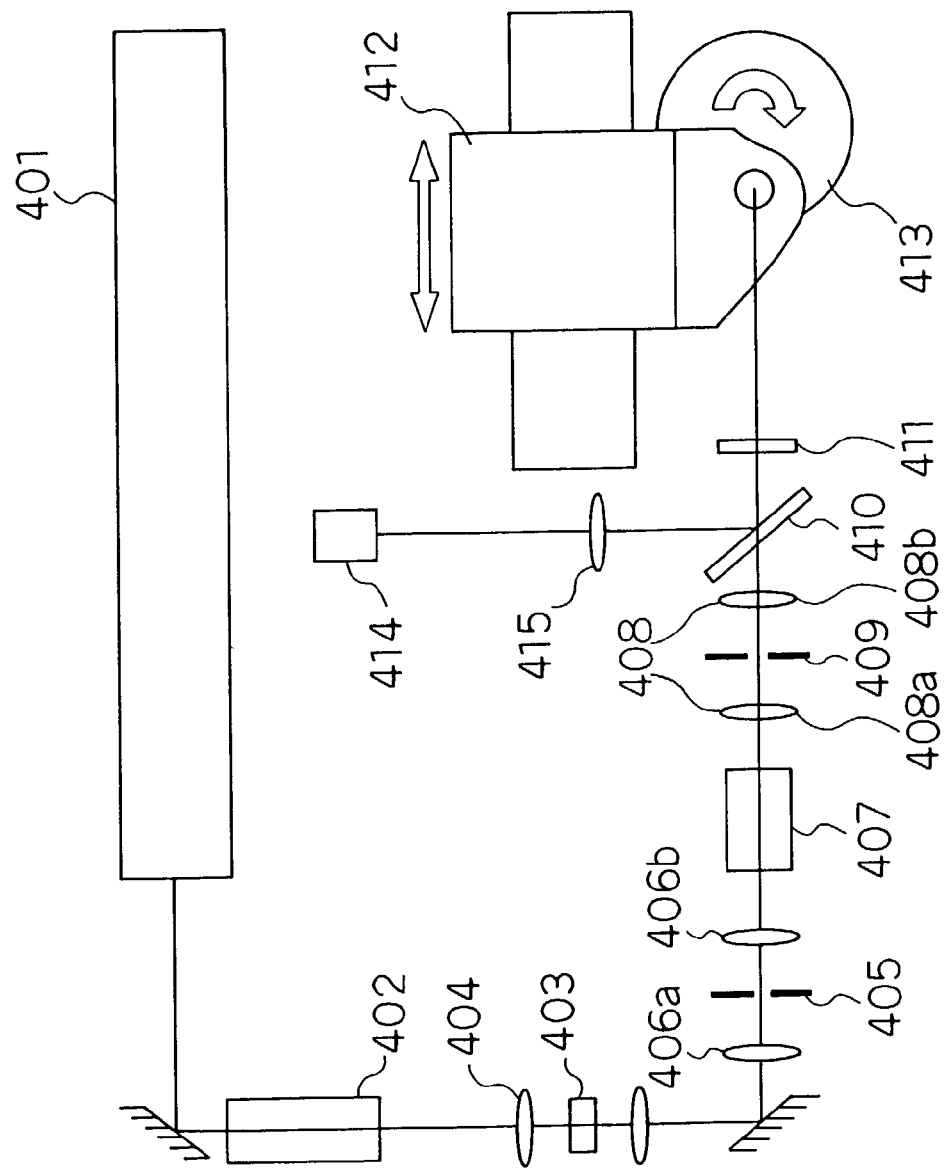
FIG. 4 illustrates Embodiment 3 of an exposure apparatus of an optical disk master of the present invention.

FIG. 4 illustrates an example of an exposure apparatus of an optical disk master of the present invention. In FIG. 4, reference numeral 401 denotes an argon ion laser with a wavelength of 248 nm which serves as a light source; 402, an EO modulator that eliminates low frequency noise of the laser and performs power control; 403, an AO modulator that performs modulation using an information signal; 404, a lens system that focuses the laser beam onto a crystal of the AO modulator 403; 405, a pinhole; 406, a lens system that focuses the laser beam toward the pinhole and forms the laser beam output into a parallel beam, 407, an EO deflector; 408, a beam expander that enlarges the laser beam to a desired beam diameter; 409, a slit of which aperture is restricted by a predetermined width in such a direction which is substantially perpendicular to the deflected direction of the deflector 407; 410, a polarizing beam splitter (PBS); 411, a ¼ wavelength plate; 412, a head that focuses the laser beam onto a resist master; 413, a turn table that turns the resist master; 414, a CCD camera that monitors the laser beam reflected from the resist master; 415, a lens that focuses the laser beam onto the CCD camera.

Furthermore, the lens system 406 is provided with a first lens 406a provided near the laser source 401 for focusing and a second lens 406b provided near the EO deflector 407 for obtaining a predetermined beam diameter.

Furthermore, the beam expander 408 is provided with a third lens 408a provided near the EO deflector 407 for focusing and a fourth lens 408b provided near the head 412 for obtaining a predetermined beam diameter. In the above-described configuration, the laser source 401 corresponds to the laser source of the present invention; the EO deflector 407, the deflector of the present invention; the lens system 406, the first lens system of the present invention; the first lens 406a, the first lens of the present invention; the second lens 406b, the second lens of the present invention; the pinhole 405, the pinhole of the present invention; the beam expander 408, the second lens system of the present invention; the third lens 408a, the third lens of the present invention; the fourth lens 408b, the fourth lens of the present invention; the slit 409, the slit of the present invention; and the head 412, the objective lens of the present invention.

The laser beam output from the laser source 401 enters the EO modulator 402, called a "noise eater" to reduce laser noise and adjust the laser beam to desired intensity. The laser beam that has passed through the noise eater enters the AO modulator 403 that performs intensity modulation using an information signal. The modulation speed of the AO modulator 403 depends on the beam diameter in the crystal and allows faster modulation as the degree of focusing of the beam increases, and therefore the lens system 404 is placed so as to come into focus in the crystal of the AO modulator 403. The primary diffracted light output from the AO modulator 403 enters the EO deflector 407 that performs deflection modulation. Furthermore, the laser beam output from the EO deflector 407 is enlarged in its beam diameter by the beam expander 408 and then focused onto the resist master by the head 412 and exposes/records the information signal.

The laser beam that has passed through the optical elements such as the AO modulator and EO modulator receives wavefront fluctuation and its beam profile is deformed from an ideal Gaussian distribution form. Generally, the focusing performance of a lens is said to deteriorate when its aberration is 30 mλ or more. This is the same as that explained with reference to FIG. 5.

Therefore, in order to eliminate the wavefront fluctuation component accumulated up to the EO deflector 407, this embodiment performs beam forming using the pinhole 405. As shown in the lens system 406, two flat convex lenses, that is, the first lens 406a and second lens 406b are used, the laser beam is focused with the first lens 406a and then the beam is formed into a parallel beam by the second lens 406b. The wavefront fluctuation accumulated so far is not focused at the focal position of the laser beam focused by the first lens 406, which is the front lens of the lens system 406 and distributed outside the beam diameter. This embodiment places the pinhole 405 at the focal position of the first lens 406a of the lens system 406, the hole diameter of which is set so as to eliminate only the disturbance component outside the beam diameter and eliminates the disturbance component outside the beam diameter before the beam passes through the second lens 406b. As the diameter of the pinhole 405, the size approximately 2.3 times the beam radius at the focal position of the lens before the pinhole 405 (first lens 406a) is used.

Furthermore, the wavefront fluctuation generated by the EO deflector 407 is not focused at the focal position of the third lens 408a, which is the front lens of the beam expander 408 and distributed outside the beam diameter. This embodiment places the slit 409 of almost the same size as the beam diameter, and of which aperture is restricted by a predetermined width in such a direction which is substantially perpendicular to the deflected direction of the deflector 305, at the focal position of the third lens 408a which is the front lens of the beam expander 408, eliminates the wavefront fluctuation component distributed outside the beam before the beam passes through the fourth lens 408b, extracts the central area with high beam intensity and eliminates wavefront fluctuation. Furthermore, this embodiment does not restrict the aperture in the deflection direction of the EO deflector 407 to prevent the beam from being blocked even at the time of deflection and prevent intensity modulation from occurring at the output. This makes it possible to improve the recording direction focusing performance when the signal pit is exposed/recorded. Here, the aperture of the slit 409 is set to approximately 2.3 times the beam radius at the focal position of the third lens 408a.

In this embodiment, an experiment has been conducted under the same conditions as those in Embodiments 1 and 2 to expose/record a pit on a glass plate coated with a resist. The beam diameter of the laser beam focused by the objective lens is calculated based on the shape of the recorded pit. As in the case of this Embodiment 3, as a result of placing the pinhole before the deflector and the slit after deflector and performing beam forming, it has been confirmed that the focusing performance of the beam diameter has been improved approximately 10% compared to the case without beam forming.

Embodiment 4

Figure 6:
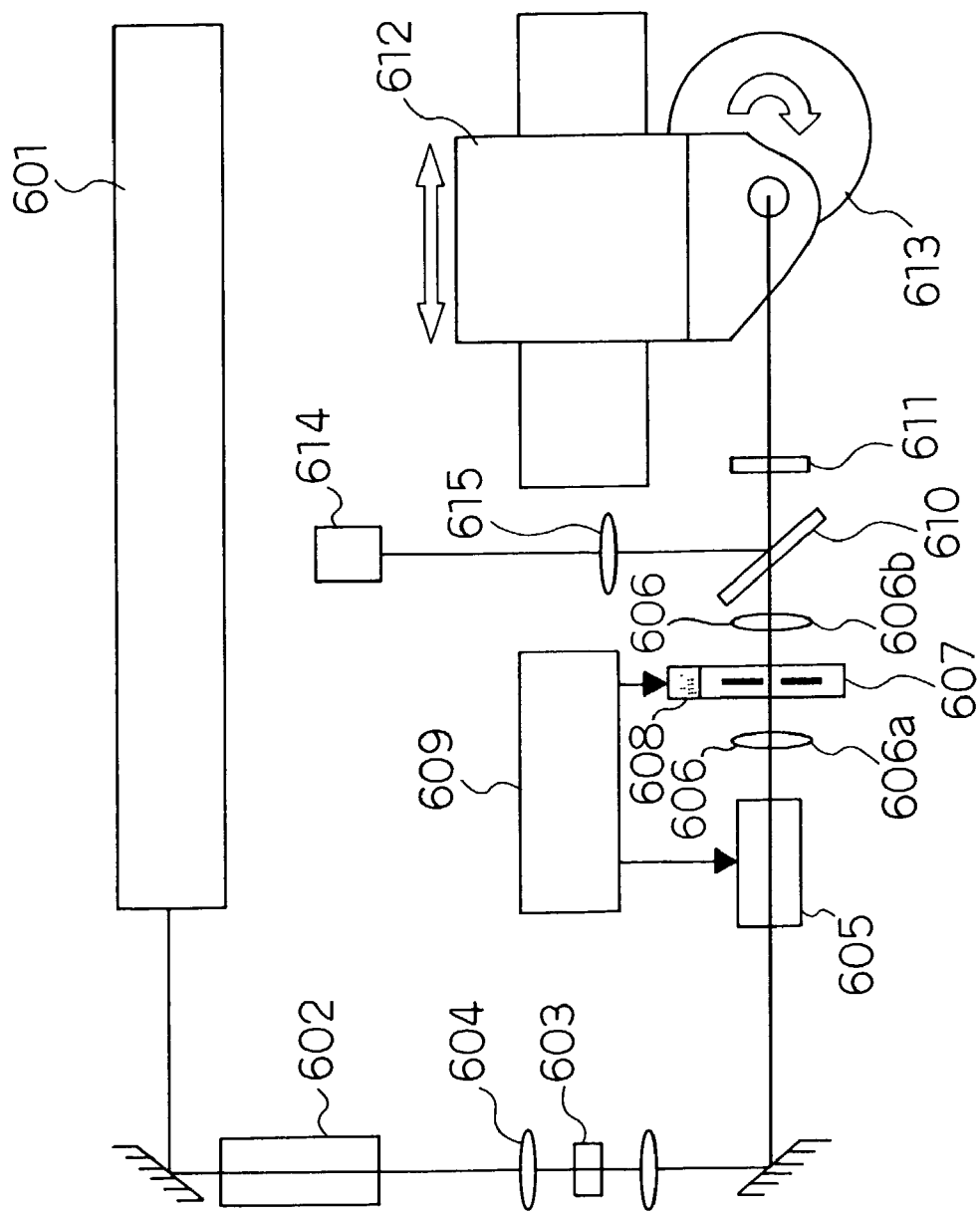
FIG. 6 illustrates Embodiment 4 of an exposure apparatus of an optical disk master of the present invention.

FIG. 6 illustrates an example of an exposure apparatus of an optical disk master of the present invention. In FIG. 6, reference numeral 601 denotes an argon ion laser with a wavelength of 248 nm which serves as a light source; 602, an EO modulator that eliminates low frequency noise of the laser and performs power control; 603, an AO modulator that performs modulation using an information signal; 604, a lens system that focuses the laser beam onto a crystal of the AO modulator; 605, an EO deflector; 606, a beam expander that focuses the laser beam toward the pinhole 607 and forms the laser beam output into a parallel beam, 607, a pinhole; 608, a piezoelectric element that moves the pinhole 607 in the direction generally perpendicular to the optical axis of the laser beam; 609, a deflection signal generator; 610, a polarizing beam splitter (PBS); 611, a ¼ wavelength plate; 612, a head that focuses the laser beam onto a resist master; 613, a turn table that turns the resist master; 614, a CCD camera that monitors the laser beam reflected from the resist master; 615, a lens that focuses the laser beam onto the CCD camera.

Furthermore, the beam expander 606 is provided with a first lens 606a provided near the EO deflector 605 for focusing and a second lens 606b provided near the head 612 for obtaining a predetermined beam diameter. By the way, in the above-described configuration, the laser source 601 corresponds to the laser source of the present invention; the EO deflector 605, the deflector of the present invention; the beam expander 606, the lens system of the present invention; the first lens 606a, the first lens of the present invention; the second lens 606b, the second lens of the present invention; the pinhole 607, the pinhole of the present invention; the piezoelectric element 608, the driving means of the present invention; the head 612, the objective lens of the present invention. Furthermore, the beam expander 606, the pinhole 607 and the piezoelectric element 608 correspond to the pinhole mechanism of the present invention. Furthermore, an embodiment of operation of the exposure apparatus of an optical disk master as well as an embodiment of the method of exposing and optical disk master and the pinhole mechanism of the present invention will be explained below.

The laser beam output from the laser source 601 enters the EO modulator 602, called a "noise eater" to reduce laser noise and adjust the laser beam to desired intensity. The laser beam that has passed through the noise eater enters the AO modulator 603 that performs intensity modulation using an information signal. The modulation speed of the AO modulator 603 depends on the beam diameter in the crystal and allows faster modulation as the degree of focusing of the beam increases, and therefore the lens system 604 is placed so as to come into focus in the crystal of the AO modulator 603. The primary diffracted light output from the AO modulator 603 enters the EO deflector 605 that performs deflection modulation. Furthermore, the laser beam output from the EO deflector 605 is enlarged in its beam diameter by the beam expander 606 and then focused onto the resist master by the head 612 and exposes/records the information signal.

The laser beam that has passed through the optical elements such as the AO modulator and EO modulator receives wavefront fluctuation and its beam profile is deformed from an ideal Gaussian distribution form. Generally, the focusing performance of a lens is said to deteriorate when its aberration is 30 mλ or more. This is the same as that explained with reference to FIG. 5.

Therefore, in order to eliminate the wavefront fluctuation of the laser beam that has passed through the optical elements, this embodiment performs beam forming using the pinhole. This is a method whereby the laser beam affected by wavefront fluctuation is focused by the lens system, a pinhole of almost the same diameter as the beam diameter at that position is placed at the focal position of the focused laser beam to eliminate the disturbance component not focused due to the wavefront fluctuation and distributed outside the beam diameter, and the central area with strong beam intensity is neatly extracted to thereby eliminate wavefront fluctuation before the beam passes through the lens for obtaining a predetermined beam diameter. At this time, it is preferable that the shape of the pinhole be a substantially perfect circle and the inner perimeter be smooth as in the case of Embodiment 1.

In order to eliminate wavefront fluctuation as much as possible, it is effective to place the pinhole at the final stage in front of the head. However, in the case of the exposure recording apparatus using the deflector, the laser beam is deflected, and therefore the pinhole cannot be placed after the deflector.

On the other hand, this embodiment attaches the piezoelectric element 608 to the pinhole 607, allows the position of the pinhole 607 to be moved in the direction substantially parallel to the deflection direction of the EO deflector 605 by the voltage input to the piezoelectric element 608 and prevents the laser beam from being blocked by the pinhole 607 even if the laser beam is deflected. When the deflection angle of the EO deflector 605 is θ, the focal distance of the front lens of the beam expander 606 of the lens system is f, then the moving distance of the pinhole 607 is f·θ. The deflection signal generator 609 outputs a deflection signal to be input to the deflector and outputs a pinhole moving signal to be input to the piezoelectric element 608. Both signals are adjusted in their amount of signal delay and operated synchronized with each other. At this time, the synchronization frequency can be set to approximately several hundreds of KHz.

Furthermore, an experiment is conducted about the beam diameter focusing performance under the same condition as that in Embodiment 1. A pit is exposed/recorded on a glass plate on which a resist is coated. Based on the shape of the recorded pit, the beam diameter of the laser beam focused by the objective lens is calculated. It has been confirmed that as a result of performing beam forming with the pinhole placed as in the case of this Embodiment 4, the beam diameter focusing performance has been improved approximately 10% compared to the case without beam forming.

Furthermore, this Embodiment 4 uses an EO modulator and AO modulator as modulators, but similar effects will also be obtained in the case of other combinations irrespective of combinations of modulators.

Furthermore, a piezoelectric element has been used as the means of moving the pinhole, but the driving means of the present invention is not limited to this if it is at least the means of moving the pinhole in synchronization with a deflection signal such as a voice coil and linear motor.

Embodiment 5

Figure 7:
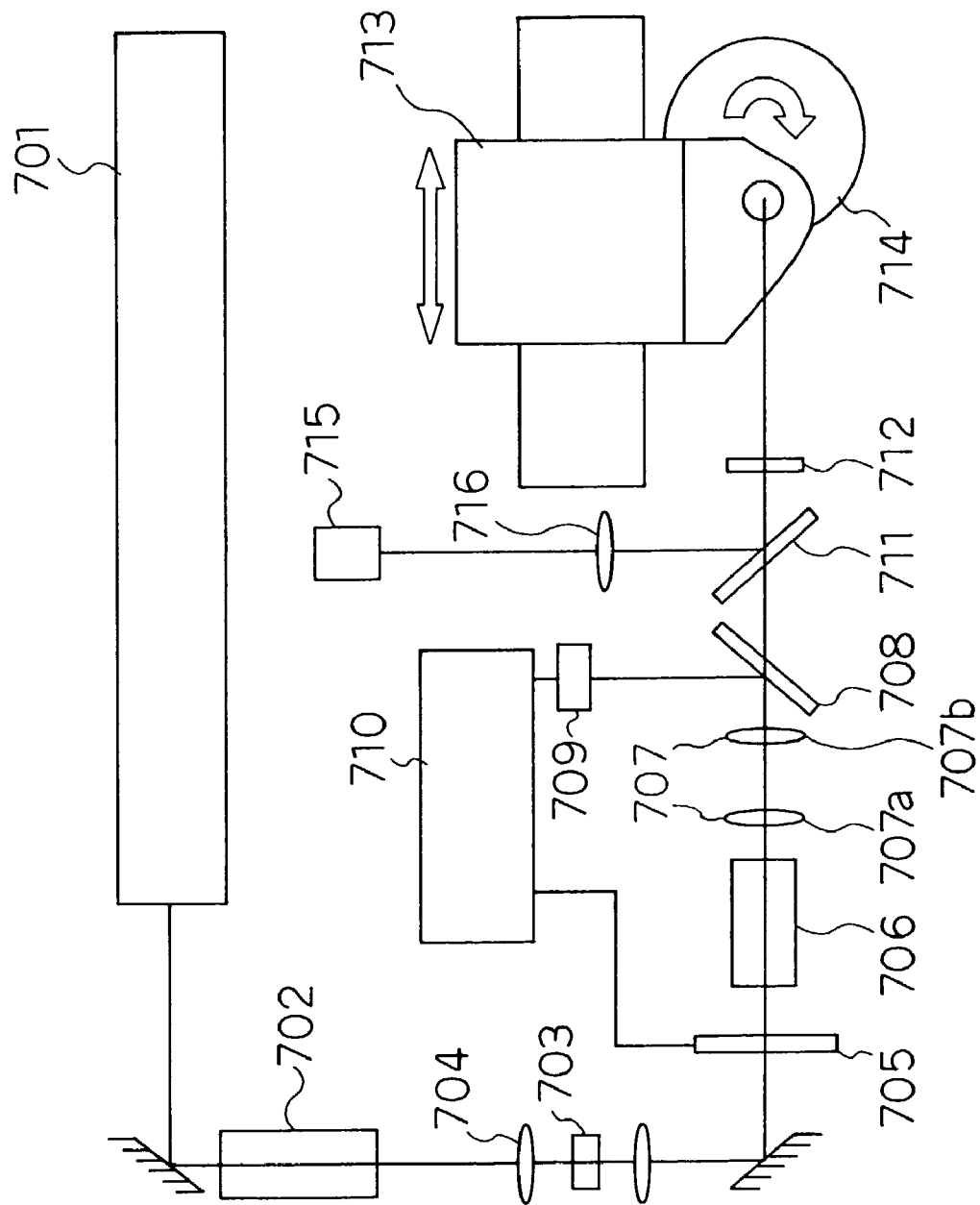
FIG. 7 illustrates Embodiment 5 of an exposure apparatus of an optical disk master of the present invention.

FIG. 7 illustrates an example of an exposure apparatus of an optical disk master of the present invention. In FIG. 7, reference numeral 701 denotes an argon ion laser with a wavelength of 248 nm which serves as a light source; 702, an EO modulator that eliminates low frequency noise of the laser and performs power control; 703, an AO modulator that performs modulation using an information signal; 704, a lens system that focuses the laser beam onto a crystal of the AO modulator 703; 705, a liquid crystal plate that adjusts wavefront fluctuation of the laser beam; 706, an EO deflector; 707, a beam expander that enlarges the laser beam to a desired beam diameter, 708, a parallel flat plate that branches the laser beam and generates interference patterns of reflected light on the back and front; 709, a photodetector that receives interference patterns; 710, an operation circuit that recognizes the interference patterns received by the photodetector 709 and generates an input signal for the liquid crystal plate 705; 711, a polarizing beam splitter (PBS); 712, a ¼ wavelength plate; 713, a head that focuses the laser beam onto the resist master; 714, a turn table that turns the resist master; 715, a CCD camera that monitors the laser beam reflected from the resist master; 716, a lens that focuses the laser beam onto the CCD camera 715. Furthermore, the beam expander 707 is provided with a first lens 707a provided near the EO deflector 706 for focusing and a second lens 707b provided near the head 713 for obtaining a predetermined beam diameter.

By the way, in the above-described configuration, the laser source 701 corresponds to the laser source of the present invention; the EO deflector 706, the deflector of the present invention; the liquid crystal plate 705, the liquid crystal plate of the present invention; the parallel flat plate 708, the parallel flat plate of the present invention; the photodetector 709, the photodetector of the present invention; the operation circuit 710, the adjusting means of the present invention; the head 713, the objective lens of the present invention. Furthermore, an embodiment of operation of the exposure apparatus of an optical disk master as well as an embodiment of the method of exposing and optical disk master of the present invention will be explained below.

The laser beam output from the laser source 701 enters the EO modulator 702, called a "noise eater" to reduce laser noise and adjust the laser beam to desired intensity. The laser beam that has passed through the noise eater enters the AO modulator 703 that performs intensity modulation using an information signal. The modulation speed of the AO modulator 703 depends on the beam diameter in the crystal and allows faster modulation as the degree of focusing of the beam increases, and therefore the lens system 704 is placed so as to come into focus in the crystal of the AO modulator 703. The primary diffracted light output from the AO modulator 703 enters the EO deflector 706 that performs deflection modulation. Furthermore, the laser beam output from the EO deflector 706 is enlarged in its beam diameter by the beam expander 707 as in the case of the beam expanders in the foregoing embodiments and then focused onto the resist master by the head 713 and exposes/records the information signal.

The laser beam that has passed through the optical elements such as the AO modulator and EO modulator receives wavefront fluctuation and its beam profile is deformed from an ideal Gaussian distribution form. This is the same as that explained with reference to FIG. 5.

Figure 11:
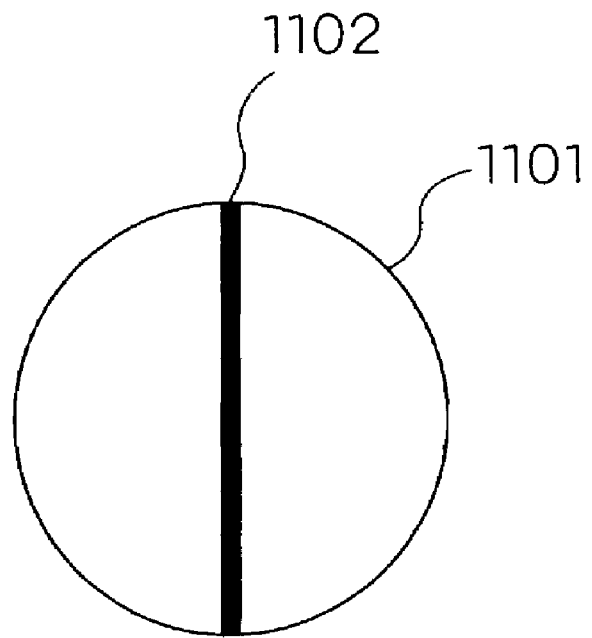
FIG. 11A illustrates an example of an interference pattern with little wavefront fluctuation formed by a parallel flat plate.
FIG. 11B illustrates an example of an interference pattern with wavefront fluctuation formed by a parallel flat plate.
Figure 11:
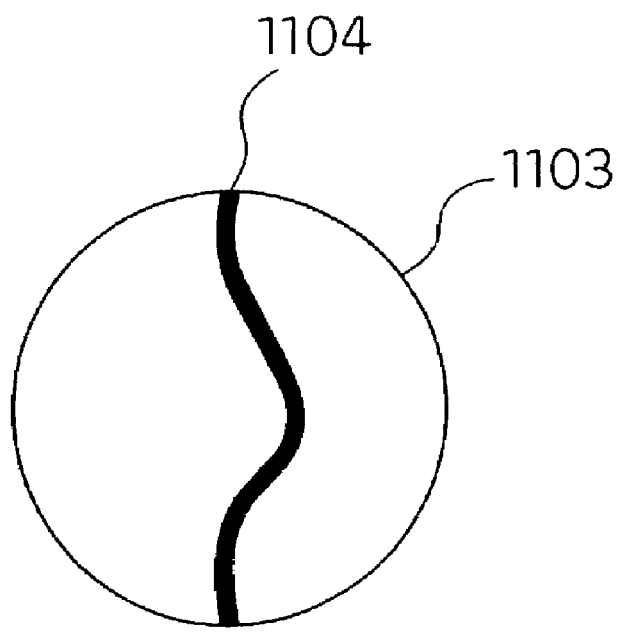

In this embodiment, part of the laser beam that has passed through the EO deflector 706, expanded in its beam diameter by the beam expander 707 and formed into a parallel beam is reflected by the parallel flat plate 708. The reflected beams on the front and back of the parallel flat plate 708 are overlapped shifted by the thickness of the parallel flat plate 708, forming an interference pattern. This interference pattern is monitored by the photodetector 709. The wavefront fluctuation of the laser beam due to the partial phase shift of the laser beams does not form a linear shadow of the interference pattern but appears deformed (black line 1104 in the figure) with the laser beam 1103 detected by the photodetector 709 as shown in FIG. 11B. An ideal state with no wavefront fluctuation is expressed with a linear (black line 1102 in the figure) shadow of the interference pattern with the laser beam 1101 detected by the photodetector 709 as shown in FIG. 11A.

The operation circuit 710 adjusts the signal input to the liquid crystal plate 705 placed before the EO deflector 706 while monitoring the shadow pattern of the interference pattern. The liquid crystal plate 705 used has three concentric parts; inner perimeter 1001, intermediate perimeter 1002 and outer perimeter 1003. This liquid crystal plate 705 can change the optical path lengths of the inner perimeter 1001, intermediate perimeter 1002 and outer perimeter 1003 by adjusting the voltages applied to the respective divided parts and can shift the phase of the laser beam that has passed through the respective parts of the liquid crystal plate 705. The signal input to the liquid crystal is adjusted so that the interference pattern monitored by the photodetector 709 becomes straighter. This configuration can reduce wavefront fluctuation of the laser beam that has passed through the EO deflector 706.

Here, the liquid crystal plate 709, which is divided into three concentric parts, is used, but the number of divided parts can be greater or smaller than this. The greater the number divided parts, the finer adjustment is possible. However, increasing the number of divided parts complicates the structure, and therefore it is desirable to adjust an appropriate number according to the size of the beam diameter of the laser beam used or application. Furthermore, the operation circuit 710 is an example of the adjusting means of the present invention, but it can be substituted by hardware such as a computer or its CPU, etc. or software.

Furthermore, an experiment is conducted about the beam diameter focusing performance under the same condition as that in Embodiment 1. A pit is exposed/recorded on a glass plate on which a resist is coated. Based on the shape of the recorded pit, the beam diameter of the laser beam focused by the objective lens is calculated. It has been confirmed that as a result of performing beam forming by adjusting the wavefront using the liquid crystal plate, the beam diameter focusing performance has been improved approximately 10% compared to the case without beam forming.

Furthermore, this Embodiment 5 uses an EO modulator and AO modulator as modulators, but similar effects will also be obtained in the case of other combinations irrespective of combinations of modulators.

As described above, according to the present invention, the exposure apparatus of an optical disk master using a deflector places a pinhole for beam forming before a deflector or places a beam forming slit after the deflector, and can thereby eliminate wavefront fluctuation of the accumulated laser beam and improve the focusing performance of the laser beam that has passed through the objective lens.

What is claimed is:

1. An exposure apparatus of an optical disk master having a laser source, a deflector for deflecting a recording laser beam obtained based on the laser beam of said laser source and an objective lens for focusing said recording laser beam on an optical disk master, comprising:
    a lens system provided between said laser source and said deflector, which has a first lens for focusing said laser beam and a second lens for adjusting said focused laser beam to a desired beam diameter, all light transmitted by said second lens being directly received by said deflector; and
    a pinhole placed at a practical focal position of said lens system,
    wherein said deflector is one of an electro-optic deflector and an acousto-optic deflector and wherein said deflector performs deflection modulation.

2. An exposure apparatus of an optical disk master having a laser source, a deflector for deflecting a recording laser beam based on the laser beam of said laser source and an objective lens for focusing said recording laser beam on an optical disk master, comprising:
    a lens system provided between said deflector and said objective lens, which has a first lens for focusing said laser beam emitted from said deflector and a second lens for adjusting said focused laser beam to a desired beam diameter; and
    a slit placed at a practical focal position of said lens system, of which aperture is restricted by a predetermined width in such a direction which is substantially perpendicular to the deflected direction of said deflector, the predetermined width is substantially the same as a diameter of the laser beam of said laser source at said practical focal position,
    wherein said deflector is one of an electro-optic deflector and an acousto-optic deflector and wherein said deflector performs deflection modulation.

3. An exposure apparatus of an optical disk master having a laser source, a deflector for deflecting a recording laser beam based on the laser beam of said laser source and an objective lens for focusing said recording laser beam on an optical disk master, comprising:
    a first lens system provided between said laser source and said deflector, which has a first lens for focusing said laser beam and a second lens for adjusting said focused laser beam to a desired beam diameter, all light transmitted by said second lens being directly received by said deflector;
    a pinhole placed at a practical focal position of said first lens system,
    a second lens system provided between said deflector and said objective lens, which has a third lens for focusing the laser beam emitted from said deflector and a fourth lens for adjusting said focused laser beam to a desired beam diameter; and
    a slit placed at a practical focal position of said first lens of said second lens system, of which aperture is restricted by a predetermined width in such a direction which is substantially perpendicular to the deflected direction of said deflector, said slit configured to eliminate at least a wavefront fluctuation component of said laser beam focused by said first lens so as to extract a central area with high beam intensity of said laser beam focused by said first lens,
    wherein said deflector is one of an electro-optic deflector and an acousto-optic deflector and wherein said deflector performs deflection modulation.

4. The exposure apparatus of an optical disk master according to any one of claims 1 to 3, wherein the wavelength of said laser source is 270 nm or less.

5. The exposure apparatus of an optical disk master according to any one of claim 1 or 3, wherein the diameter of said pinhole is $2.5 \cdot \lambda \cdot f/w$ or less, where $\lambda$ is a wavelength of said laser source, f is a focal distance of the lens for focusing said laser beam, and w is the radius of the beam incident upon the lens for focusing said laser beam.

6. The exposure apparatus of an optical disk master according to claim 2 or 3, wherein the aperture of said slit is 2.5·λ·f/w or less, where λ is a wavelength of said laser source, f is a focal distance of the lens for focusing said laser beam, and w is the radius of the beam incident upon the lens for focusing said laser beam.

7. The exposure apparatus of an optical disk master according to claim 2, wherein the direction of aperture of the slit is perpendicular to a direction of polarization of the deflector.

8. The exposure apparatus of an optical disk master according to claim 7, wherein the slit is configured to eliminate at least a wavefront fluctuation component.

9. The exposure apparatus of an optical disk master according to claim 3, wherein the second lens of the first lens system has an optically uninterrupted path to said deflector.

10. An exposure apparatus of an optical disk master having a laser source, a deflector for deflecting a recording laser beam based on the laser beam of said laser source and an objective lens for focusing said recording laser beam on an optical disk master, comprising:

a lens system provided between said deflector and said objective lens, which has a first lens for focusing said laser beam emitted from said deflector and a second lens for adjusting said focused laser beam to a desired beam diameter; and a slit placed at a practical focal position of said lens system, of which aperture is restricted by a predetermined width in such a direction which is substantially perpendicular to the deflected direction of said deflector, wherein said deflector is one of an electro-optic deflector and an acousto-optic deflector and wherein said deflector performs deflection modulation, and said slit and said lens system adjust the laser beam emitted from said deflector to the desired beam diameter with maintaining a similarity of a shape of said laser beam.

\* \* \* \* \*